(12) United States Patent
Carmody et al.

(10) Patent No.: US 7,963,387 B2
(45) Date of Patent: Jun. 21, 2011

(54) TRANSPORTABLE PICK-UP CONVEYOR

(76) Inventors: Keith Leslie Carmody, Sarina (AU); David Charles Shepherd, Sarina (AU)

( * ) Notice: Subject to any disclaimer, the term of this patent is extended or adjusted under 35 U.S.C. 154(b) by 196 days.

(21) Appl. No.: 12/303,233

(22) PCT Filed: Jun. 6, 2007

(86) PCT No.: PCT/AU2007/000791
§ 371 (c)(1),
(2), (4) Date: Dec. 2, 2008

(87) PCT Pub. No.: WO2007/140528
PCT Pub. Date: Dec. 13, 2007

(65) Prior Publication Data
US 2009/0178898 A1    Jul. 16, 2009

(30) Foreign Application Priority Data

Jun. 6, 2006  (AU) ................... 2006903050
Feb. 20, 2007 (AU) ................... 2007900789

(51) Int. Cl.
*B65G 65/22* (2006.01)
(52) U.S. Cl. ................ 198/513; 198/308.1; 198/716
(58) Field of Classification Search ............. 198/308.1, 198/513, 519, 716
See application file for complete search history.

(56) References Cited

U.S. PATENT DOCUMENTS

| | | | | |
|---|---|---|---|---|
| 3,650,370 A | * | 3/1972 | Smith | 198/518 |
| 3,724,635 A | * | 4/1973 | Byrd | 198/304 |
| 3,744,164 A | | 7/1973 | Harrison | |
| 3,851,481 A | * | 12/1974 | Swoager | 405/291 |
| 3,874,736 A | | 4/1975 | Anderson et al. | |
| 3,887,061 A | * | 6/1975 | Hopkins | 198/304 |
| 3,976,186 A | * | 8/1976 | Neier | 198/314 |
| 4,030,217 A | | 6/1977 | Satterwhite | |
| 4,044,887 A | | 8/1977 | Stog | |
| 4,718,537 A | * | 1/1988 | Miller | 198/513 |
| 5,226,497 A | | 7/1993 | Beaton | |
| 5,871,260 A | | 2/1999 | Delli-Gatti, Jr. | |
| 6,296,106 B1 | | 10/2001 | Marchesini | |
| 6,591,971 B1 | * | 7/2003 | Sheahan | 198/518 |
| 2005/0274590 A1 | | 12/2005 | Kwiat | |

FOREIGN PATENT DOCUMENTS

| | | |
|---|---|---|
| DE | 19830880 | 1/2000 |
| EP | 1364714 | 11/2003 |
| GB | 1310531 | 3/1973 |
| RU | 1399237 | 5/1998 |
| SU | 578234 | 10/1977 |
| WO | 03/013987 | 2/2003 |

* cited by examiner

*Primary Examiner* — Joe Dillon, Jr.
(74) *Attorney, Agent, or Firm* — Shoemaker and Mattare

(57) ABSTRACT

Material handling apparatus (10) for collecting and handling particulate material such as particulate coal, the apparatus (10) comprising an elongated hollow conveyor housing (19) along which an endless chain (43) extends, the chain (43) carrying a plurality of transverse flights (44), the housing (19) being supported adjustably on a mobile chassis (11), and a materials collection head (31) at one end of the housing (19) which includes augers (38) for directing particulate material towards a central portion of the head (31) for engagement by the flights (44) which convey the collected materials along the housing (10) to an outlet (21).

20 Claims, 7 Drawing Sheets

TRANSPORTABLE PICK-UP CONVEYOR

TECHNICAL FIELD

This invention relates to a method and apparatus for handling materials and in particular to a method and apparatus for handling particulate materials including rocks and rock-like materials.

BACKGROUND ART

In coal loading apparatus in which mined coal is conveyed on a conveyor for loading onto a ship for example, stacker reclaimers are provided to collect the coal from the conveyor and store the coal for subsequent transfer to the ship. During this process, there is a considerable spillage of coal from the conveyor onto the underlying ground. To collect the spilled material, the conveyor is required to be shut down and machinery or manual labour used to collect the spilled material. Because of the limited area underneath the conveyor, there is currently no suitable machinery which can be used to efficiently collect the spilled material. In addition, shutting down of the conveyor results in a considerable additional cost in handling and loading. To use manual labour to collect the spilled materials is time consuming and labour intensive.

Furthermore, in the case of a major spillage, there can be a considerable build up of coal on the conveyor belt which can cause undesirable heating of the belt. The only effective way to clean the conveyor is to apply a high pressure spray or jet of water onto the conveyor. This procedure wastes considerable volumes of water which is obviously undesirable.

SUMMARY OF THE INVENTION

The present invention aims to provide a method of and apparatus for handling materials and in particular to a method and apparatus for collecting particulate or granular materials. The present invention is particularly but not exclusively suited to collecting coal or other materials spilled from a conveyor. Other objects and advantages of the invention will become apparent from the following description.

The present invention thus provides in a first preferred aspect, material handling apparatus for collecting and handling particulate material, said apparatus comprising an elongated hollow conveyor housing, a mobile chassis supporting said elongated housing, a materials collection head at one end of said housing for collecting particulate material, conveyor means within said housing and extending into said materials collection head for conveying said collected materials along said housing, and an outlet for said conveyed materials at the end of said housing opposite said collection head.

The term "particulate material" as used throughout the specification and claims includes small particulate material such as granular coal or the like as well as larger particulate materials such as rock or ore.

Preferably the collection head extends transversely of the conveyor housing, suitably at right angles to the housing. The collection head suitably includes auger means to direct materials towards the conveyor means whereby such materials may be engaged by the conveyor means and conveyed along the housing towards the outlet. Preferably the conveyor means and auger means are driven by a common drive means. Preferably the collection head extends to opposite sides of the conveyor housing such that the conveyor housing extends centrally from the collection head. Preferably the auger means comprise augers members on opposite sides of the housing and conveyor means for directing materials towards a central region of the collection head. Preferably the collection head includes a rotatable shaft carrying the respective auger members of the auger, the auger members being of opposite hand on opposite sides of the housing whereby rotation of the shaft and auger members in one direction will cause materials on opposite sides of the housing to be directed towards the housing for engagement by the conveying means. The auger members suitably comprise helically extending members. The members may comprise plate-like members extending radially outwardly from the shaft.

Preferably the collection head includes a hollow body which houses the auger means, the hollow body being suitably of open trough-like form. Suitably the hollow body includes a mouth in which materials to be collected are received, the mouth being directed forwardly relative to the normal operational direction of movement of the apparatus. Preferably the hollow body is of a part-circular cross section. Preferably the opposite ends of the body are of substantially circular disc-like configuration to guide materials to be collected towards the mouth of the housing and auger means housed therein. Preferably the conveyor housing intersects the hollow body of the collection head and an entrance opening into the conveyor housing is defined at the point of intersection. The entrance opening is suitably of a rectangular configuration.

The conveyor means suitably comprises an endless conveyor carrying a plurality of spaced flights adapted to cooperate with the material to convey the material along the housing. Preferably the endless conveyor is supported on the auger shaft. Most preferably the conveyor means comprises a chain conveyor. The chain conveyor suitably comprises an endless chain supported by spaced sprockets and the flights are fixed to the chain at a regular spacing along the chain.

Preferably a first sprocket is fixed to the auger shaft in the collection head housing whereby the rotation of the first sprocket will effect rotation of the shaft. The first sprocket is suitably arranged between the respective auger members. Preferably a second sprocket of the chain conveyor is supported in the conveyor housing at a position spaced from the collection head and suitably adjacent the outlet of the housing. Preferably the second sprocket comprises a drive sprocket for driving the chain conveyor. Drive means are suitably provided to drive the second sprocket and thus the conveyor chain to causes drive to be transmitted to the shaft in the collection head via the first sprocket thereon to effect rotation of the auger members. The drive means for the second sprocket suitably comprises an hydraulic drive motor. The auger members thus rotate simultaneously with movement of the chain conveyor and the auger members and conveyor are driven by a common drive meas. Preferably the second drive sprocket has a smaller diameter than the first sprocket such that the speed of rotation of the first sprocket and thus the auger means in operation is less than the speed of rotation of the second sprocket.

The conveyor housing suitably is of a substantially rectangular cross section having top and bottom walls and substantially planar side walls, the side walls being substantially upright. The conveyor chain is suitably arranged centrally of the housing and the flights of the conveyor means suitably extend substantially the full width of the housing between the housing side walls. The chain suitably has upper and lower runs extending along the housing and the lower run of the chain is suitably positioned adjacent the bottom wall of the conveyor housing such that the flights thereon cooperate with and engage the material collected by the collection head and convey the material along the bottom wall of the housing. The flights may slide in use along the bottom wall. Elongated guide means are suitably provided to guide the lower run of the chain to maintain the flights adjacent to the bottom wall of the conveyor housing.

Preferably the flights extend transversely of, and suitably at right angles to, the chain and on opposite sides thereof. Preferably the chain carries a plurality of plates on opposite sides thereof to which the flights are secured. The flights may be of a T-shaped configuration in cross-section with the top or cross flange of the T- being substantially horizontal in the upper and lower runs of the chain and the leg flange of the T- being substantially vertical at least in the lower run of the chain whereby the flights act as paddles to convey or sweep the collected materials along the lower side of the conveyor housing. Preferably the top flanges of the T-shaped flights slide along the lower wall of the conveyor housing. The leading edges of the top flanges may be tapered or sharpened to assist in lifting or scraping material from the lower wall of the housing.

Preferably the conveyor housing is mounted to the mobile chassis so as to be adjustable in attitude relative to the mobile chassis. Preferably the housing may be selectively adjusted in inclination relative to the mobile chassis. Thus the front end and/or rear end of the housing may be selectively raised or lowered. Alternatively or additionally, the conveyor housing may be adjusted in elevation relative to the mobile chassis. Preferably the conveyor housing is connected to the mobile chassis via hydraulic rams which provide the means to adjust the housing relative to the chassis.

Preferably the mobile chassis includes endless drive tracks. The drive tracks are suitably arranged on opposite sides of the housing. The drive tracks are suitably supported on respective sub-frames of the chassis. The sub-frames are suitably interconnected for concurrent movement with each other. The sub-frames are suitably connected by cross arms extending beneath the conveyor housing.

Preferably the hydraulic rams for controlling the attitude and/or elevation of the conveyor housing comprises a pair of hydraulic rams associated with each sub-frame. Preferably the pair of hydraulic rams comprises forward and rearward rams connected between the front and rear of the sub-frame and conveyor housing respectively.

The sub-frames suitably support front and rear rollers, sprockets or wheels about which the endless drive tracks are supported. One of the rollers, sprockets or wheels of each drive track suitably comprise a drive roller, sprocket or wheel driven by drive means. Preferably the drive tracks are capable of being driven independently by the drive means whereby the apparatus may be steered.

The drive means for the drive rollers, sprockets or wheels of the drive tracks suitably comprise hydraulic motors. Preferably hydraulic drive motors are provided for each drive roller, sprocket or wheel on opposite sides of the chassis.

Preferably remote control means are provided to selectively control the application of hydraulic fluid to the hydraulic motors and rams. The remote control means suitably comprise wireless remote control means. Preferably hydraulic pumps are supported on the apparatus to provide a supply of hydraulic fluid to the hydraulic motors and rams. Preferably the hydraulic pumps are driven by one or more internal combustion engines. Preferably a pair of hydraulic pumps for supply of hydraulic fluid to the respective hydraulic drive motors for the drive tracks of the mobile chassis are driven by one internal combustion engine. Preferably an hydraulic pump for supply of hydraulic fluid to the hydraulic drive motor for the conveyor drive sprocket and hydraulic rams is driven by a second internal combustion engine. Control valves are suitably provided to selectively control the supply of hydraulic fluid to the motors and rams. The control valves suitably comprise solenoid-actuated valves or other electrically operated valves controllable by the remote control means. The solenoid-actuated valves are suitably provided in electric control circuits controlled by the remote control means. Valve means are also suitably provided to divert hydraulic fluid from the hydraulic supply pump for the conveyor to the hydraulic motors for the drive tracks so as to enable the speed of movement of the chassis to be increased for use in a transport mode in moving of the apparatus to different locations.

Preferably the outlet of the housing is defined by opening at its end opposite the collection head through which materials may be discharged from the housing.

The present invention in a further aspect provides a method of handling particulate materials, said method including the steps providing an elongated conveyor housing having conveyor means therein and a materials collecting head at one end of said conveyor housing, said conveyor means extending into said collecting head, positioning said collecting head adjacent particulate material to be handled, collecting said materials in said head and moving said collected materials towards said conveyor means, and operating said conveyor means to convey said materials along said housing from said one end thereof to exit from the opposite end thereof.

Preferably the material exiting from the opposite end of the apparatus is collected in the bucket of a loader such as a mini-loader or the like.

BRIEF DESCRIPTION OF THE DRAWINGS

In order that the invention may be more readily understood and put into practical effect, reference will now be made to the accompanying drawings which illustrate a preferred embodiment of the invention and wherein.

DETAILED DESCRIPTION OF THE PREFERRED EMBODIMENT

Figure 1:
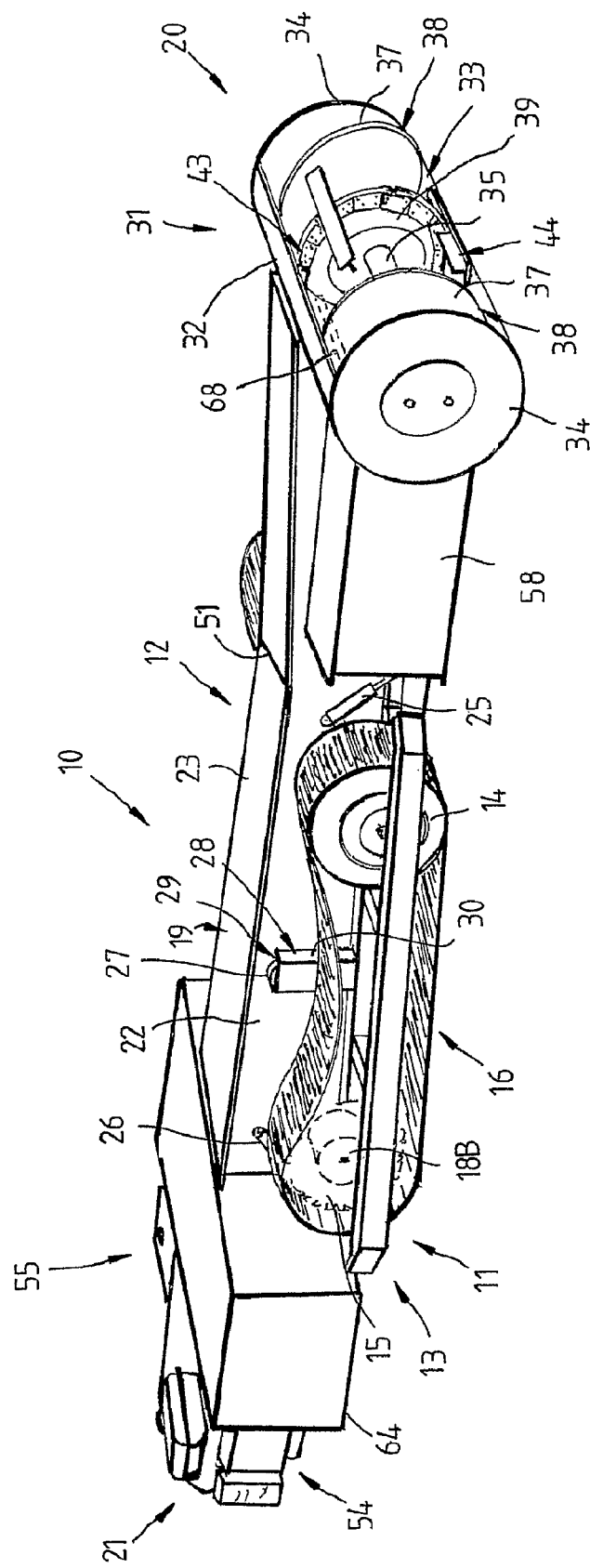
FIGS. 1 and 2 are opposite perspective views of the material handling apparatus according to an embodiment of the invention.
Figure 2:
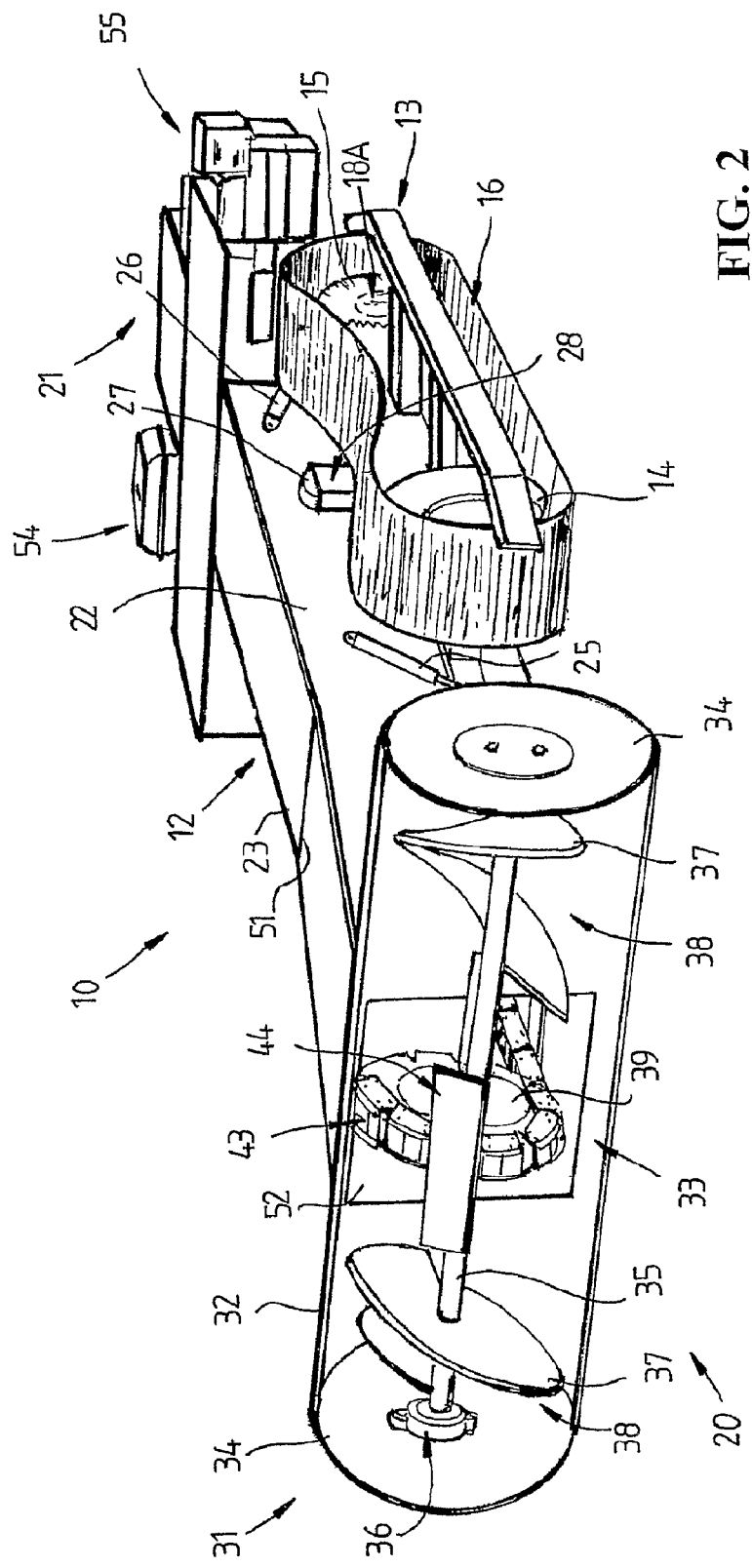
Figure 5:
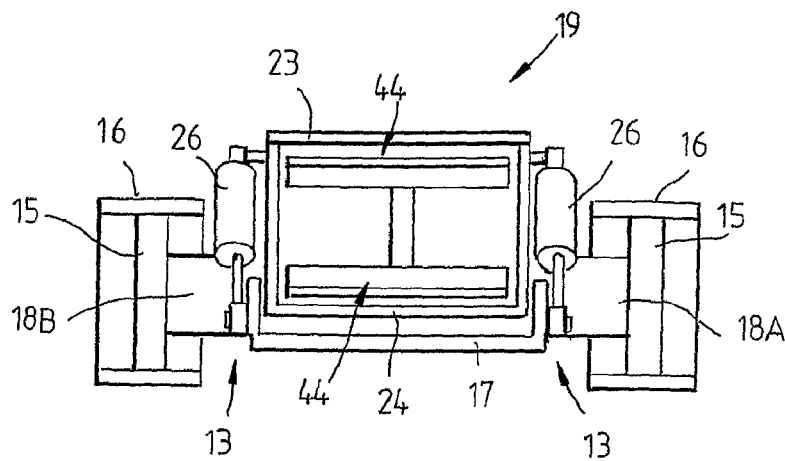
FIG. 5 is a schematic cross sectional view along line A-A of FIG. 3.
Figure 6:
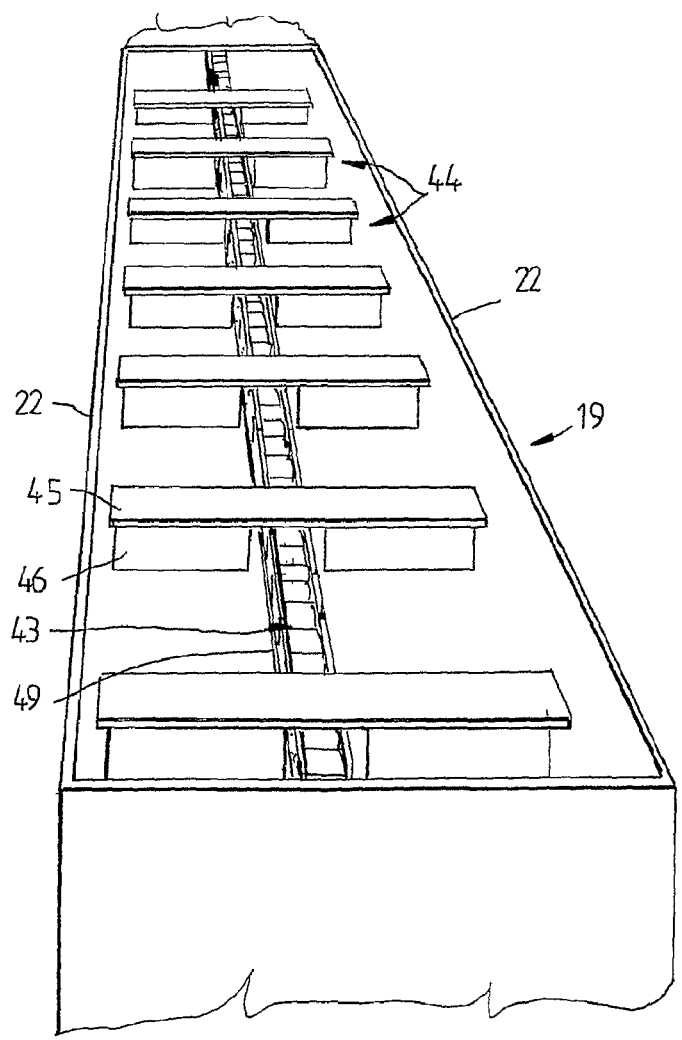
FIG. 6 is a view from above of the conveyor assembly.
Figure 7:
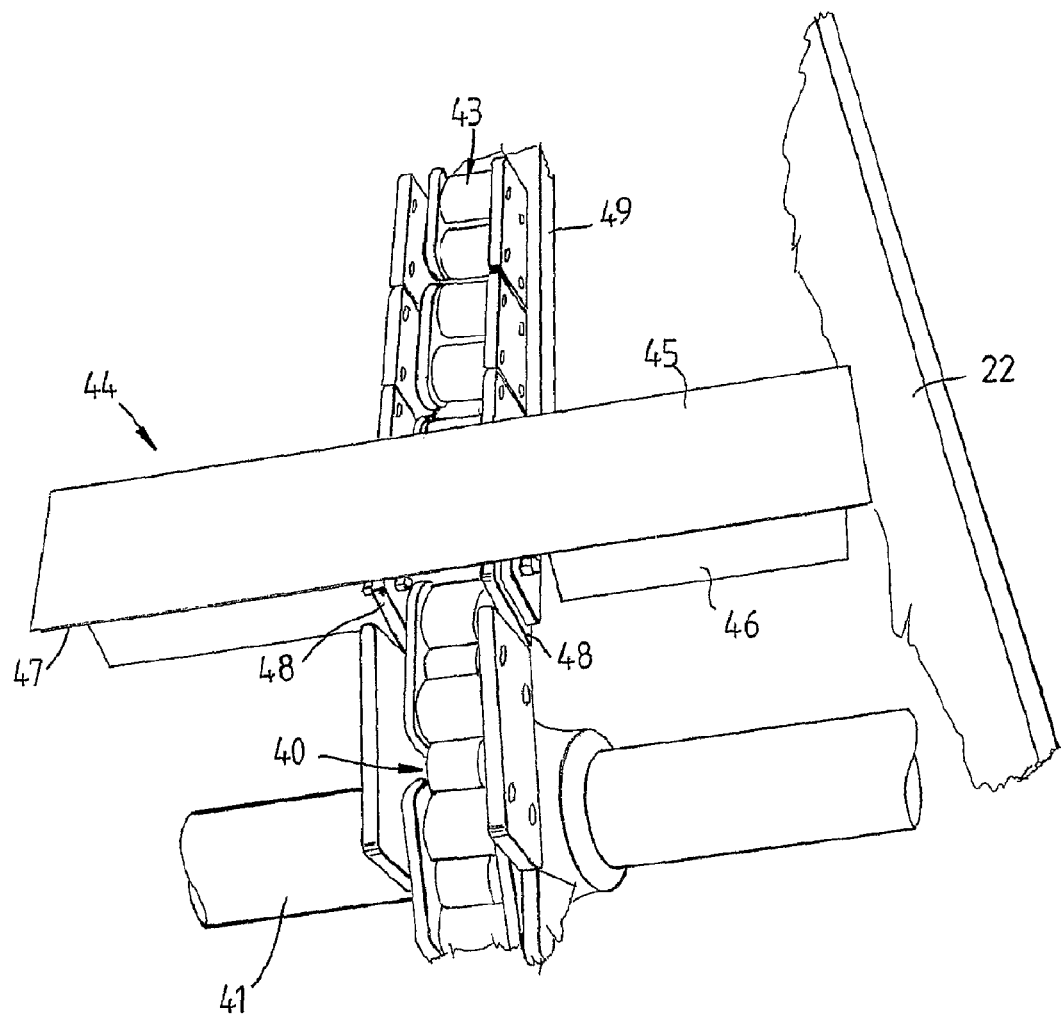
FIG. 7 illustrates details of one of the flights of the conveyor assembly.

Referring to the drawings and firstly to FIGS. 1 and 2, there is illustrated material handling apparatus 10 according to an embodiment of the present invention for handling particulate materials typically particulate coal, the apparatus 10 including a mobile support chassis 11 and a main material collecting and handling assembly 12 supported on the support chassis 11. The support chassis 11 includes a pair of sub-frames 13 on opposite sides of the handling assembly 12 which support forward rollers or wheels 14 and rear drive sprockets 15 about which endless tracks 16 are supported. The sub-frames 13 as shown in FIG. 5 are rigidly interconnected by a pair of cross arms 17, only one of which is shown, which extend beneath the material collecting and handling assembly 12 so that the sub-frames 13 are fixed for common movement with to each other. The drive sprockets 15 are coupled to respective hydraulic motors 18A and 18B shown in FIG. 5 and in dotted outline in FIGS. 1 and 2) so that motive force can be transmitted to the tracks 16 to effect forward and reversing movement of the apparatus 10 and also to enable the apparatus 10 to be steered by controlling the operation of the respective hydraulic motors 18A and 18B which drive the drive sprockets 15.

Figure 3:
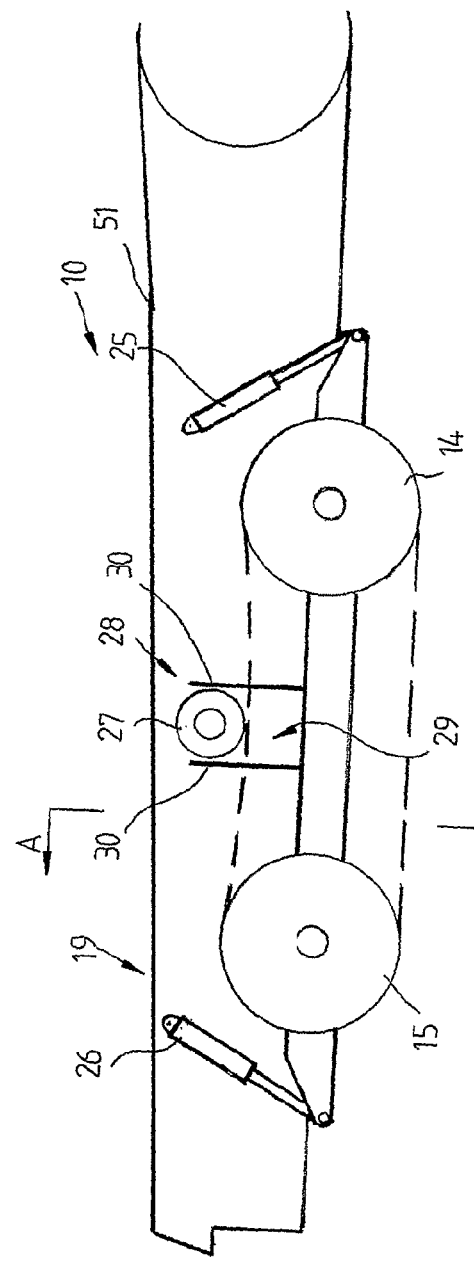
FIG. 3 illustrates schematically a side view of the apparatus of FIGS. 1 and 2.

The material handling assembly 12 includes an elongated hollow housing 19 which is substantially rectangular in cross section and the material handling assembly 12 includes an inlet end 20 and an outlet end 21. The elongated hollow housing 19 has opposite side walls 22 and top and bottom walls 23 and 24 respectively and the housing 19 is supported to the sub-frames 13 by front and rear hydraulic actuators or rams 25 and 26 (see also FIG. 3) which are arranged on opposite sides of the housing 10 and pivotally connected at opposite ends to the side walls 22 of the housing 19 and the sub-frames 13 respectively. Extension and retraction of the respective rams 25 and 26 enables adjustment of the attitude of the housing 19 relative to the sub-frames 13. This therefore permits the inlet end 20 to be raised or lowered as desired by operation of the rams 25 to facilitate positioning of the inlet end 20 adjacent to the materials to be collected. Similar the rear rams 26 can be extended or retracted to adjust the elevation of the outlet end 21 of the housing 19. In addition, both sets of rams 25 and 26 can be extended or retracted simultaneously to effect the above adjustments and also adjust the height of the housing 19. The housing 19 can also be lowered by the rams 25 and 26 to seat on and be supported by the cross arms 17 in a fully lowered position.

To guide movement of the housing 19 relative to the support chassis 11 and to transfer the load encountered by the material handing assembly 12 on the housing 19 to the support chassis 11, rollers 27 are mounted on opposite side walls of the housing 19 and substantially upright channel shaped members 28 are fixed to the respective sub-frames 13 of the chassis 11, respective rollers 27 being located neatly within respective channels 29 of the channel shaped members 28 to cooperate with the flanges 30 of the members 28. Thus when the housing 19 is elevated or lowered by means of the rams 25 and 26 or changed in inclination, the rollers 27 will roll within the channels 29 and any fore and aft load on the housing 19 will be transferred through the rollers 29 and channel shaped members 28 to the chassis 11.

Figure 4:
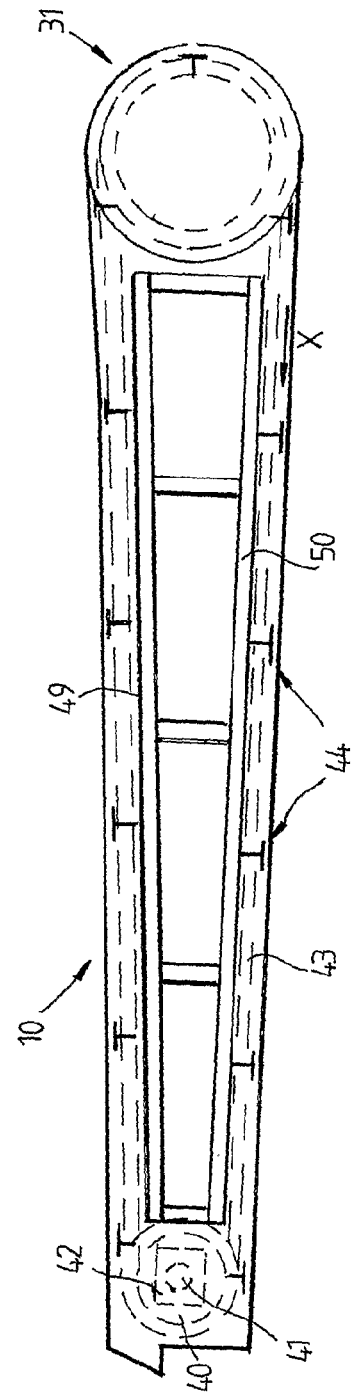
FIG. 4 illustrates schematically the material collecting and conveying mechanism of the apparatus of FIGS. 1 and 2.

Supported at the inlet end 20 of the assembly 12 is a material collecting head 31 which includes a transversely extending hollow body 32 of part circular cross section, the body 32 extending symmetrically to opposite sides of the housing 19 at right angles thereto and being forwardly open to define an entrance mouth 33. Opposite ends of the body 32 are closed by end disc-shaped walls 34 of circular cross section which act as guides. A transverse shaft or axle 35 is located in the body 32 and is supported by bearings 36 mounted centrally to the end walls 34 at opposite ends of the body 32. Mounted to opposite end portions of the axle 35 on opposite sides of the housing 19 are helically extending flanges 37 which define augers 38 of opposite hand. A first sprocket 39 is fixedly mounted centrally to the axle 35 between the augers 38. A second drive sprocket 40 (see FIG. 4) is mounted within and at the rear of the housing 19 on a bearing mounted shaft 41 adjacent the outlet end 21. A hydraulic drive motor 42 is mounted externally to the housing 19 and is coupled to the sprocket shaft 41. The sprocket 40 is of a smaller diameter than the sprocket 39 to effectively form a gearing between the sprocket 40 and sprocket 39 such that the speed of rotation of the sprocket 39 and thus the augers 38 is less than that of the sprocket 40 so that increased power can be exerted by the augers 38.

A chain 43 extends around the sprockets 39 and 40 and carries a series of transversely extending flights 44 as shown in FIGS. 4 to 7 to define a conveyor assembly which extends partly into the boy 32. The flights 44 are of T-shaped cross section and formed of plate and are oriented so that the top plates or cross flanges 45 of the T-in the upper and lower runs of the chain 43 are substantially horizontal and the leg 46 is substantially vertical in the upper and lower chain runs. The leading end of each top plate or flange 45 relative to its direction of movement is tapered as at 47 (see FIG. 7) to effectively form a blade.

The flights 44 are mounted by respective plates 48 fixed to opposite sides of the chain 43 for movement therewith. The upper run of the chain 43 is supported by an upper guide 49 arranged centrally of the housing 19 and the T-shaped flights 44 extend substantially the full width of the housing 19 between the opposite upright planar walls 22 thereof. The lower run of the chain 43 is guided along a lower guide 50 which holds the chain 43 at a substantially constant spacing from the lower wall 24 of the housing 19 which maintains the flights 44 in a position adjacent the wall 24 so that the flights 44 slide along the wall 24 in their movement rearwardly of the head 31. The housing 19 increases in height from point 51 forwardly in a diverging manner to the head 31 where the housing 19 intersects the body 32 and defines an open rectangular entrance 52 into the housing 19 (see FIG. 2).

Figure 8:
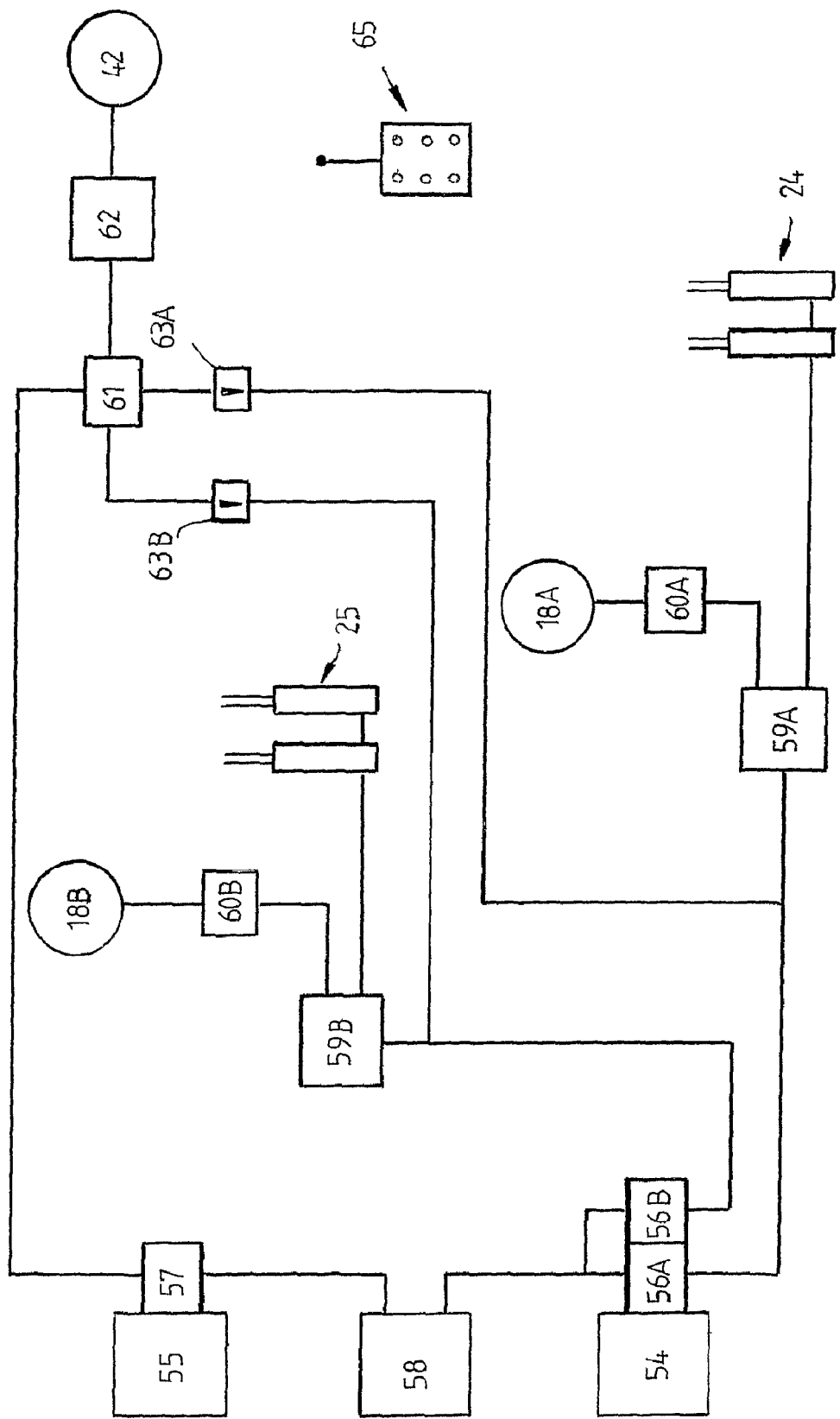
FIG. 8 illustrates schematically the hydraulic control circuit of the apparatus.

A pair of internal combustion engines 54 and 55 are mounted on opposite sides of the housing 19 adjacent the outlet 21. As shown in FIG. 8, one engine 54 drives a pair of hydraulic pumps 56A and 56B and the other engine 55 drives a single hydraulic pump 57 for supply of hydraulic fluid from an hydraulic reservoir 58 mounted to the side of the housing 19 behind the head 31 to the hydraulic motors 18A and 18B, hydraulic motor 42 and rams 25 and 26. Pump 56A is connected to a pair of control valves 59A (in this embodiment double spool valves), one of which is connected through lock-out valve 60A to the track motor 18A and the other of which is connected to the front rams 24. The other pump 56B is connected a similar pair of control valves 59B (also in this embodiment double spool valves), one of which is connected through lock-out valve 60B to the track motor 18B and the other of which is connected to the rear rams 25.

The pump 57 is connected via a diverter valve 61 to a further control valve 62 (in this embodiment a single spool valve) for supply of fluid to the conveyor motor 42 for operation of the conveyor assembly. The diverter valve 61 is connected through a pair of one-way valves 63A and 63B to the control valves 59A and 59B. The diverter valve 61 can be operated to disconnect the hydraulic supply from the motor 42 and connect the supply from the pump 57 through the one-way valves 63A and 63B to the valves 59A and 59B. This enables an increase in hydraulic fluid to be supplied to the track motors 18A and 18B to enable increase travel speed of operation of the apparatus 10 in moving the apparatus 10 to different locations. All the control valves described above are mounted in a housing 64 on opposite sides of the conveyor housing 19.

The control valves of the hydraulic circuits described above are solenoid control valves connected in electrical control circuit which may be actuated by a hand held wireless remote control unit 65 to enable remote control of the apparatus 10 through the unit 64.

Figure 9:
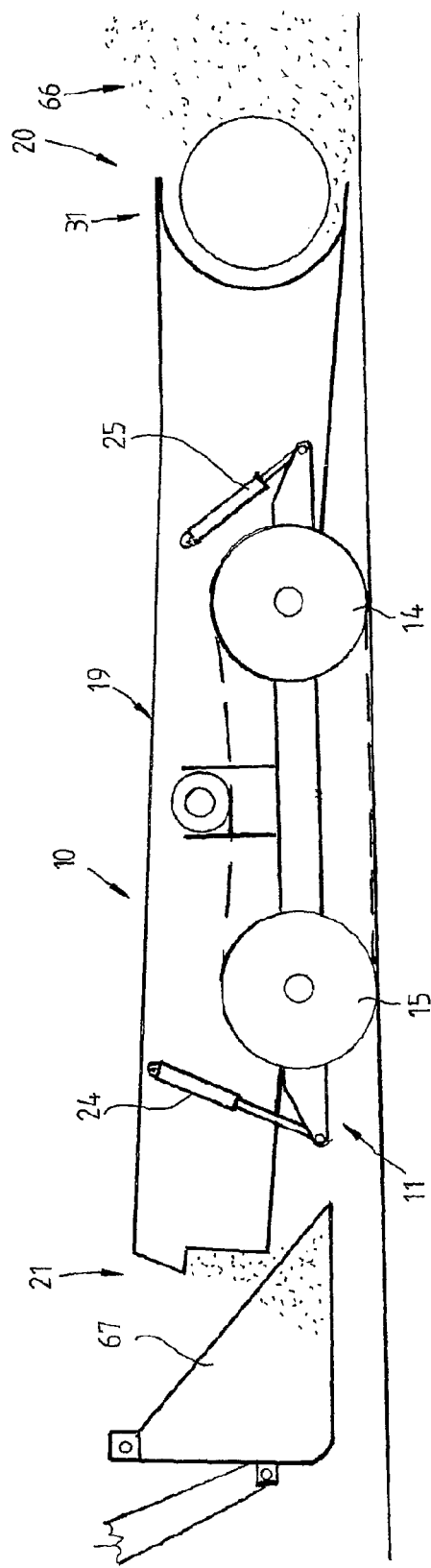
FIG. 9 illustrates schematically the manner of operation of the apparatus of FIGS. 1 and 2.

In use and as shown in FIGS. 8 and 9, when the engines 54 and 55 are operating, the remote control unit 65 is actuated to cause the application of hydraulic fluid via the valves 59A and 59B and 60A and 60B to the hydraulic drive motors 18A and 18B to drive the drive sprockets 15 to advance and steer the apparatus 10 towards particulate material 66 such as coal which may be in a heap as illustrated in FIG. 9. For increased travel speed, the diverter valve 61 is operated to divert hydraulic fluid from the pump 50 via the one-way vales 63A and 63B to the hydraulic motors 18A and 18B through the valves 59A and 59B and 60A and 60B.

The control valves 59A and 59B are then operated under the control of the remote control unit 65 to cause the hydraulic rams 24 and 25 to lower or raise the housing 19 to position the material collecting head 31 adjacent to the material 66. In FIG. 9, the housing 19 has been adjusted to lower the head 31. At the same time, the valve 62 is operated by the remote control unit 65 to cause the hydraulic motor 42 to drive the drive sprocket 40 and through the chain 43 cause rotation of the sprocket 39 and thus the axle 35. Rotation of the axle 35 will cause rotation of the augers 38. When the head 31 is moved into contact with the particular material 66, the material will be moved by the augers 38 inwardly from opposite sides of the head 31 towards the central opening or entrance 52 into the conveyor housing 19. The material is then engaged by the respective flights 44 which are rotating within the body 32 and moved or swept into the housing 19 and along the bottom wall 24 of the housing 19 by the flights 44 towards the outlet end 21 of the housing 19 from which the material exits. As the top plates or cross flanges 45 of the flights 42 slide along the bottom wall 24 of the housing 19, the leading tapered ends 47 thereof lift the material so that the flights 44 act in the nature of an excavator blade.

To collect the materials exiting the housing 19 which has an outlet opening at the end 21, a bucket 67 of a loader for example a mini-loader may be positioned so that the materials exiting the outlet end 21 of the housing 19 is deposited into the bucket 67. The loader carrying the bucket 67 can then transport the material where required.

The apparatus 10 is particularly suited for collecting coal spilt from a conveyer of the like. The low profile of the apparatus 10 allows it to be used without the necessity of stopping operation of the conveyor and thus there is no loss of efficiency in loading. The low profile of the apparatus however also allows the apparatus 10 to be positioned in other constricted areas. As the apparatus 10 can be remotely controlled, it can be controlled by an operator remote from the materials to be collected.

Typically the apparatus 10 has a height of 450 mm and is 3.7 meters long however the apparatus may be of any dimensions. The engines 54 and 55 which drive the hydraulic pumps of the hydraulic circuit are in the illustrated embodiment 5.5 Hp internal combustion engines but may be of other horsepower. Other motive means may alternatively be used to drive the hydraulic pumps for the hydraulic circuits.

Whilst the conveyor is described in the embodiment to be a chain conveyor, the conveyor may comprise an endless belt or belt which carries the flights and the sprockets are replaced by pulleys to support the endless belt.

The augers 38 may be provided with spaced elongated elements on their periphery (shown in dotted outline at 68 in FIG. 1) which extend in the general direction of the axle 35 and rotate with the augers 38 to assist in breaking up the material to be conveyed.

The terms "comprising" or "comprises" as used throughout the specification and claims are taken to specify the presence of the stated features, integers and components referred to but not preclude the presence or addition of one or more other feature/s, integer/s, component/s or group thereof.

Whilst the above has been given by way of illustrative embodiment of the invention, all such variations and modifications thereto as would be apparent to persons skilled in the art are deemed to fall within the broad scope and ambit of the invention as defined in the appended claims.

The invention claimed is:

1. Material handling apparatus for collecting and handling particulate materials, said apparatus comprising
    an elongated hollow conveyor housing,
    a mobile chassis supporting said elongated housing,
    said housing having top and bottom walls and opposite side walls,
    a materials collection head supported at one end of said housing for collecting particulate material,
    said materials collection head comprising a hollow body extending transversely of said conveyor housing and having an open entrance mouth at its leading end,
    said hollow conveyor housing intersecting said hollow body and defining therewith an entrance into said housing, auger means within said body,
    said auger means comprising a support axle or shaft extending longitudinally of said collection head and transversely of said conveyor housing and auger members supported on said axle for rotation therewith,
    conveyor means within said housing and extending through said housing entrance into said materials collection head for conveying said collected materials along said housing,
    said conveyor means including a plurality of transversely extending flights positioned to slide along said bottom wall of said conveyor housing during operation of said conveyor means,
    said conveyor means being mounted at one end on said axle or shaft in said collection head, and
    drive means at the opposite end of said conveyor means and connected to said conveyor means such that operation of said drive means causes operation of said conveyor means and thereby rotation of said axle or shaft and rotation of said auger means whereby said materials may be collected by said auger means and transferred to said conveyor means and conveyed by said flights of said conveyor means along said bottom wall of said housing, and
    an outlet for said conveyed materials at the end of said housing opposite said collection head.

2. Material handling apparatus as claimed in claim 1 wherein
    said collection head extends symmetrically to opposite sides of said housing and wherein
    said auger means comprise auger members on opposite sides of the housing entrance and mounted on opposite end portions of said axle or shaft,
    respective said auger members being of opposite hand whereby rotation of said axle or shaft and auger members by said drive means will cause materials on opposite sides of the collection head to be directed towards the housing entrance for engagement by the conveyor means and wherein said conveyor means is mounted to said axle or shaft between said auger members.

3. Material handling apparatus as claimed in claim 2 wherein said hollow body is of a part-circular cross section and wherein the opposite ends of said body are of substantially circular disc-like configuration to define side boundaries of said mouth and being adapted to guide materials to be collected towards the mouth of said body and said auger means.

4. Material handling apparatus as claimed in claim 2 wherein said conveyor means comprises an endless conveyor member extending longitudinally and centrally of said housing and wherein said flights extend to opposite sides of said endless conveyor member.

5. Material handling apparatus as claimed in claim 4 wherein said conveyor member comprises an endless chain supported by spaced sprockets, said sprockets comprising a first leading sprocket fixed to said axle or shaft in said collection head between respective said auger members and said flights being arranged at a regular spacing along said chain.

6. Material handling apparatus as claimed in claim 5 wherein a second said sprocket is supported in said housing at a position spaced from the collection head, said drive means being mounted to said housing and coupled to said second sprocket for rotatably driving said second sprocket and thus said conveyor chain.

7. Material handling apparatus as claimed in claim 4 wherein said conveyor housing is of a substantially rectangular cross section and wherein said flights of said conveyor means extend substantially the full width of the conveyor housing between the side walls thereof and each said flight being of a T-shaped cross section comprising a top cross flange and a leg flange and wherein each said cross flange is positioned to slide in use along said bottom wall of said housing.

8. Material handling apparatus as claimed in claim 7 wherein the leading end of said cross flange is sharpened or tapered.

9. Material handling apparatus as claimed in claim 1 wherein said mobile chassis includes endless drive tracks on opposite sides of said conveyor housing and wherein said conveyor housing is mounted to the mobile chassis by front and rear hydraulic rams, said rams being operable to raise or lower the front or rear of the conveyor housing so as to selectively adjust the inclination of said conveyor housing away from a horizontal attitude or adjust the elevation of said conveyor housing.

10. Material handling apparatus as claimed in claim 9 wherein said drive tracks are supported on respective subframes on opposite sides of said conveyor housing, and drive means for each said drive track adapted to independently drive said drive tracks whereby said apparatus may be steered.

11. Material handling apparatus as claimed in claim 1 wherein said drive means for said drive tracks and said conveyor means comprising respective hydraulic motors, and including hydraulic supply means and selectively actuable hydraulic control valves for controlling the supply of hydraulic fluid from said supply means to each of said hydraulic motors.

12. Material handling apparatus as claimed in claim 11 wherein said control valves include a valve for diverting hydraulic fluid from said hydraulic motor of said conveyor means to said hydraulic motors for said drive tracks to enable the travel speed said apparatus to be increased.

13. Material handling apparatus as claimed in claim 11 and including wireless remote control means for selectively controlling said hydraulic valves and thereby application of hydraulic fluid to each of the said hydraulic motors.

14. Material handling apparatus for collecting and handling particulate material, said apparatus comprising an elongated enclosed hollow conveyor housing, a mobile chassis supporting said elongated housing in a substantially horizontal attitude, a materials collection head supported to one end of said housing for collecting particulate material, said materials collection head comprising a hollow body having an open entrance mouth at its leading end, said hollow body having a part-circular cross section, said conveyor housing intersecting said hollow body and defining therewith an entrance into said conveyor housing, said collection head extending substantially at right angles to and on opposite sides of said housing, auger means within said hollow body of said collection head, said auger means comprising spaced auger members on opposite sides of the housing entrance, said auger members being mounted on a rotatable shaft for rotation therewith, respective auger members being of opposite hand, an endless conveyor within said housing and extending through said housing entrance into said materials collection head for conveying collected materials along said housing, said endless conveyor being mounted at one end to said shaft between said auger member and including a plurality of flights extending transversely of said housing, drive means mounted to said housing for driving said endless conveyor and via said endless conveyor said shaft of said auger means to cause rotation of said auger means to enable in use materials on opposite sides of the housing to be directed by said auger means towards the housing entrance for engagement by the conveyor for movement by said flights along a bottom wall of said housing, and an outlet for said conveyed materials at the end of said housing opposite said collection head.

15. Material handling apparatus as claimed in claim 13 wherein said endless conveyor comprises a chain extending longitudinally and centrally along said conveyor housing, said chain being mounted on first and second spaced apart sprockets, said first sprocket being mounted to said auger shaft between said auger members and said second sprocket being mounted to said housing.

16. Material handling apparatus as claimed in claim 14 wherein said flights are T-shaped in cross section, each comprising a cross flange and a leg flange, said cross flanges being positioned to slide along the bottom wall of said conveyor housing.

17. Material handling apparatus as claimed in claim 13 wherein said mobile chassis includes endless drive tracks on opposite sides of said conveyor housing and wherein said conveyor housing is mounted to the mobile chassis by front and rear hydraulic rams, said rams being operable to raise or lower the front or rear of the conveyor housing so as to selectively adjust the inclination of said conveyor housing away from a horizontal attitude or adjust the elevation of said conveyor housing.

18. A low profile material handling apparatus for collecting and handling particulate material, said apparatus comprising an elongated hollow conveyor housing, said conveyor housing being of a rectangular cross section and having top and bottom walls and opposite side walls and first and second ends, a mobile chassis supporting said elongated housing, a materials collection head supported at one end of said housing for collecting particulate material, said material collection head comprising a hollow body extending transversely of said housing and to opposite sides thereof, said hollow body being open on its leading side to define an entrance mouth and said first end of said conveyor housing intersecting said hollow body of said collection head to define a rectangular entrance opening into said conveyor housing, an axle extending transversely of said housing and being supported for rotation in said hollow body, first and second opposite augers members supported on opposite end portions of said axle for rotation with said axle, said auger members being located to opposite sides of said conveyor entrance, a first chain sprocket supported on said axle between said auger members for rotation therewith, a second chain sprocket supported at the second end of said housing, a chain guide within said housing and extending longitudinally thereof and a conveyor chain extending longitudinally and centrally of said housing and mounted to said first and second sprockets, upper and lower runs of said conveyor chain being located above and below said chain guide, a plurality of conveyor flights mounted at spaced apart positions to said chain and extending to opposite sides thereof, said chain guide positioning said flights at the lower run of said chain adjacent or on the bottom wall of said conveyor housing for slidable movement therealong, a drive motor mounted to said housing and coupled to said second sprocket for driving said chain and through said chain and said first sprocket, said axle to cause rotation of said auger members to collect said materials and move in use said materials towards said entrance of said conveyor housing and to enable said flights to convey materials collected by said auger members along said bottom wall of said housing, and an outlet for said conveyed materials at the second end of said housing.

19. Material handling apparatus as claimed in claim 18 wherein said flights are T-shaped in cross section, each comprising a cross flange and a leg flange, said cross flanges being positioned by said guide to slide along the bottom wall of said conveyor housing and wherein said leg flanges are positioned substantially vertically in the lower run of said chain.

20. Material handling apparatus as claimed in claim 7 and including a chain guide extending longitudinally of said conveyor housing, wherein said guide guides a lower run of said chain at a substantially constant spacing from said bottom wall of said housing and wherein said cross flanges of said flights are substantially horizontal and said leg flanges of said flights are substantially vertical in said lower run of said chain.

* * * * *